US007426500B2

(12) United States Patent
Dragojlovic

(10) Patent No.: US 7,426,500 B2
(45) Date of Patent: Sep. 16, 2008

(54) PARALLEL COMPUTER ARCHITECTURE OF A CELLULAR TYPE, MODIFIABLE AND EXPANDABLE

(76) Inventor: Neven Dragojlovic, 9 Rue El Farabi, Tangier (MA) 90000

( * ) Notice: Subject to any disclaimer, the term of this patent is extended or adjusted under 35 U.S.C. 154(b) by 905 days.

(21) Appl. No.: 10/351,484

(22) Filed: Jan. 27, 2003

(65) Prior Publication Data

US 2004/0080628 A1 Apr. 29, 2004

(51) Int. Cl.
*G06E 1/00* (2006.01)
*G06F 15/16* (2006.01)
*G06K 9/00* (2006.01)

(52) U.S. Cl. .............. 706/26; 712/28; 712/35; 712/36; 382/165; 382/203

(58) Field of Classification Search .......... 706/26, 706/28, 29, 42
See application file for complete search history.

(56) References Cited

U.S. PATENT DOCUMENTS

| | | | | |
|---|---|---|---|---|
| 5,361,328 A | * | 11/1994 | Takatori et al. | 706/20 |
| 5,530,953 A | * | 6/1996 | Nagazumi | 706/42 |
| 5,771,337 A | * | 6/1998 | Venier | 706/41 |
| 5,903,255 A | * | 5/1999 | Busch et al. | 345/594 |
| 2001/0048477 A1 | * | 12/2001 | Misawa | 348/272 |

FOREIGN PATENT DOCUMENTS

JP        2001086518 A  *  3/2001

OTHER PUBLICATIONS

S. Mertoguno and N. Bourbakis, ("A digital retina-like low level vision processor", Bio-Informatics and Biomedical Engineering, 2000. Proceedings. IEEE International Symposium on.*
Andrew B. Watson and Albert J. Ahumada, Jr. "A Hexagonal Orthogonal-Oriented Pyramid as a Model of Image Representation in Visual Cortex", IEEE transactions on biomedical engineering. vol. 36, No. 1, Jan. 1999.*
P. A. Medennikov "Description of a hexagonal pyramid in problems of image processing and vision simulation", Opticheskiy Zhurnal 60, 40-45 (Jun. 1993).*

(Continued)

*Primary Examiner*—Anthony Knight
*Assistant Examiner*—Nathan H. Brown, Jr.
(74) *Attorney, Agent, or Firm*—Louis Ventre, Jr.

(57) ABSTRACT

This processing is distributed among number of simple hexagonal units distributed in a honeycomb layer, consisting of a central hexagram surrounded by six receiving cells, each representing an invariable binary place fed into central hexagram's CPU controlled by a simple program. The activated receiving cells indicate the presence of a stimulus. The interconnected layers overlap so that the higher-level receiving cells get input from the lower-level central hexagrams and higher-level output modifies lower-level programs as well as sends input to other levels or Memory Units. Integration of layer output is achieved in 3D Memory Unit Complex consisting of truncated octagons, where each hexagonal side represents a binary number linked to 6 others through one binary place that makes adjacent numbers different. The input into each Memory Unit comes from the output of a Patch of central hexagrams a clocked input, other-layer output or a Memory Unit feedback.

3 Claims, 17 Drawing Sheets
(16 of 17 Drawing Sheet(s) Filed in Color)

OTHER PUBLICATIONS

Algis Garliauskas, "The visual cortex modeling by the hexagonal topology",Neurocomputing (Netherlands), vol. 38-40, p. 1229-38, Jun. 2001.*

Michael J. Daily "Color image segmentation using Markov random fields", Computer Vision and Pattern Recognition, 1989. Proceedings CVPR '89, IEEE Society Conference on.*

Ratha et al., "Computer Vision Algorithms on Reconfigurable Logic Arrays", IEEE Transactions on Parallel and Distributed Systems, vol. 10, No. 1, Jan. 1999.*

Mok, "Angle-multiplexed storage of 5000 holograms in lithium niobate", Jun. 1, 1993 / vol. 18, No. 11 / Optics Letters.*

* cited by examiner

PARALLEL COMPUTER ARCHITECTURE OF A CELLULAR TYPE, MODIFIABLE AND EXPANDABLE

STATEMENT REGARDING FEDERALLY SPONSORED RESEARCH OR DEVELOPMENT

Not applicable.

REFERENCE TO SEQUENCE LISTING, A TABLE OR A COMPUTER PROGRAM LISTING

Not applicable.

BACKGROUND OF THE INVENTION

1. Field of Invention

I have been teaching High School sciences, reading avidly on all sorts of topics, including computing, and got stimulated by the Chinese Book of Change (I Ching), but do not know of anything similar ever being attempted.

2. Description of Prior Art

The following weak points of present day computers drew me toward development of this new computer architecture:

1) Inability of computers to process large amount of information simultaneously, therefore taking very long time to calculate through reiterations, thus limiting processing of information in time and great complexity of programming.

2) Inability of computer to deal adequately with [variability of the same] input variability.

3) Inability of computers in distinguishing figure from ground, except when actually programmed to look for a specific input.

4) Inability of computers to associate previously non-related inputs that may have similarities in figure or background, except if programmed with [a] very elaborate lists, therefore not finding anything unexpected. [That could be termed "lack of imaginaton".]

5) [I am a firm dualist in the philosophical sense, and, even though I admire all the attempts at elucidation of our brain functioning, I am firmly convinced that "consciousness" can not be mechanized.] Creating a general-purpose computer architecture that could be used adequately in Artificial Intelligence and could investigate and hopefully eventually settle [that question] the question of intelligence and consciuousness.

BRIEF SUMMARY OF THE INVENTION

This computer architecture uses localized "cells" for computation, where each cell reacts only to its immediate environment. [When] Cell groups are organized in Layers that are interconnected, [so that] where higher levels can modify lower level computations. Complex processing of information can be achieved [by] with simple digital programs in each [cell] Central Hexagram, [and] as well as the hardware architecture, [that] which becomes a part of parallel programming.

Memory structure [would be] distributed in a three dimensional structure that would allow for associations of previously unrelated stimuli, recognition of variations of previous stimuli, creation of figure/ground divisions, separation of figure from any specific ground, and allow for further [complexification of] information processing through addition of [additional] levels and modules.

This computer architecture would speed up processing, and [eventually] be able to reach decisions in real time.

This computer architecture would allow for investigation of many Artificial Intelligence and human concepts, like "feeling", "intuition", "imagination", etc.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

[the "holograms"] hologram-like memory storage when it coincides with the input from the Sensory Level Patch.

Figure 14:
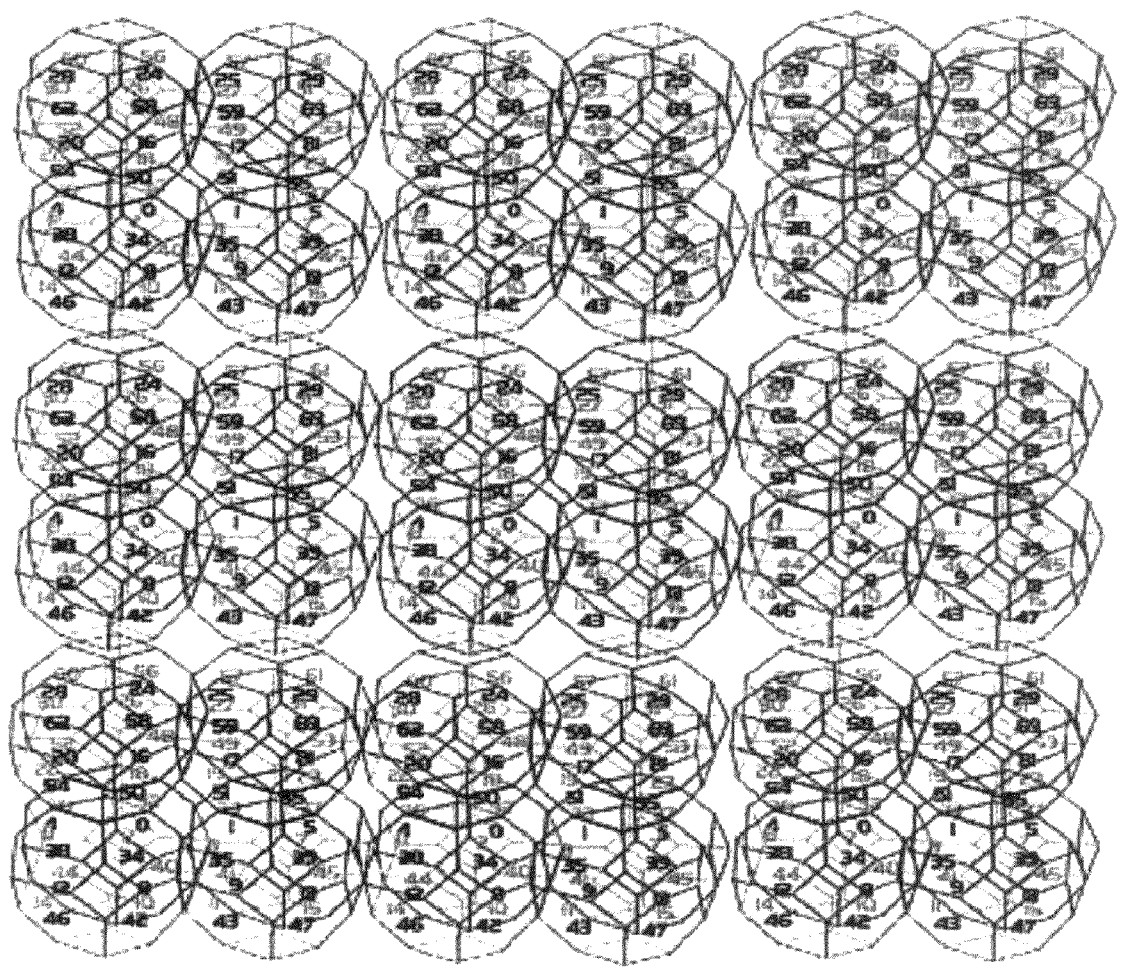

FIG. 14: [Three dimensional] 3D representation of how Memory Units [would] fit together into a Memory Unit complex, showing only the X-Y plane. In fact, each Memory Unit [could connect] connects with 6 other memory units, the same way that each Patch of Sensory Level [2a] connects with 6 other patches that would cover completely the Sensory Level input. The adjacent numbers anywhere in the complex would still have only one binary place difference, and clock waves could reach into adjacent Memory Units, thus binding together the whole input field.

Figure 15:
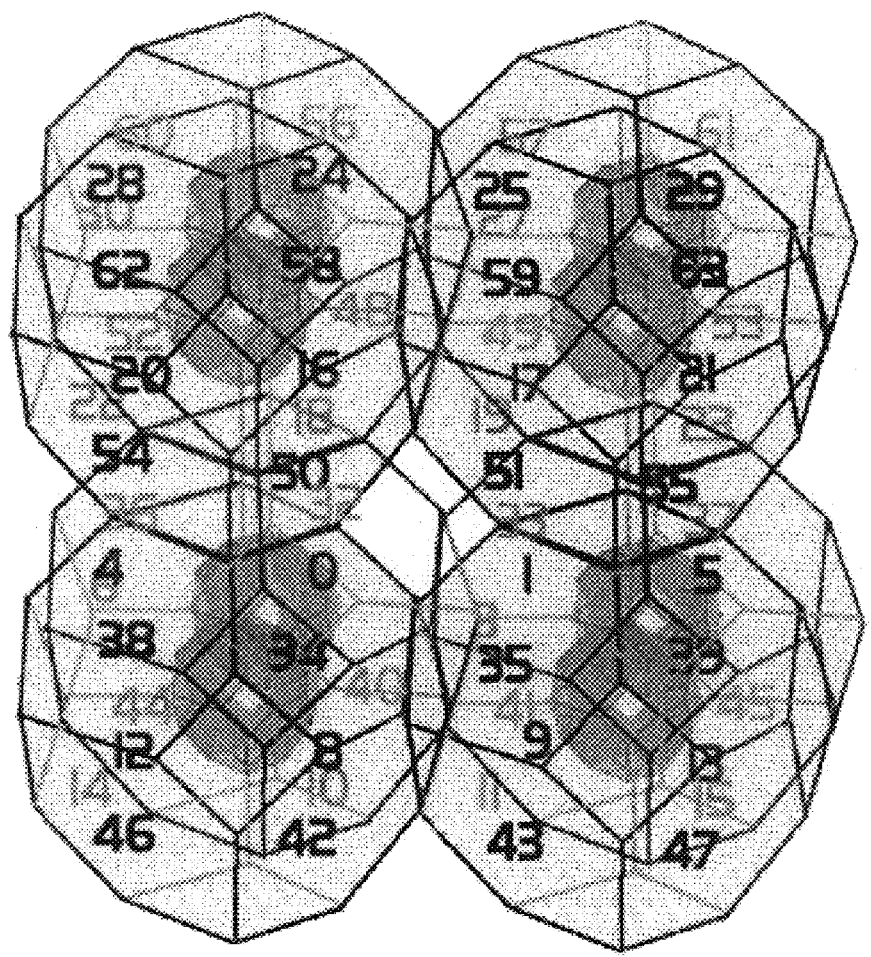

FIG. 15: [Three dimensional] 3D representation of Inner Octagons within a Memory Unit. Each Inner Octagon is activated by the 8 side hexagon numbers that surround it (if those numbers are activated by Level 4 input) and has "handshake" connections with 6 adjacent inner octagons.

Figure 16:
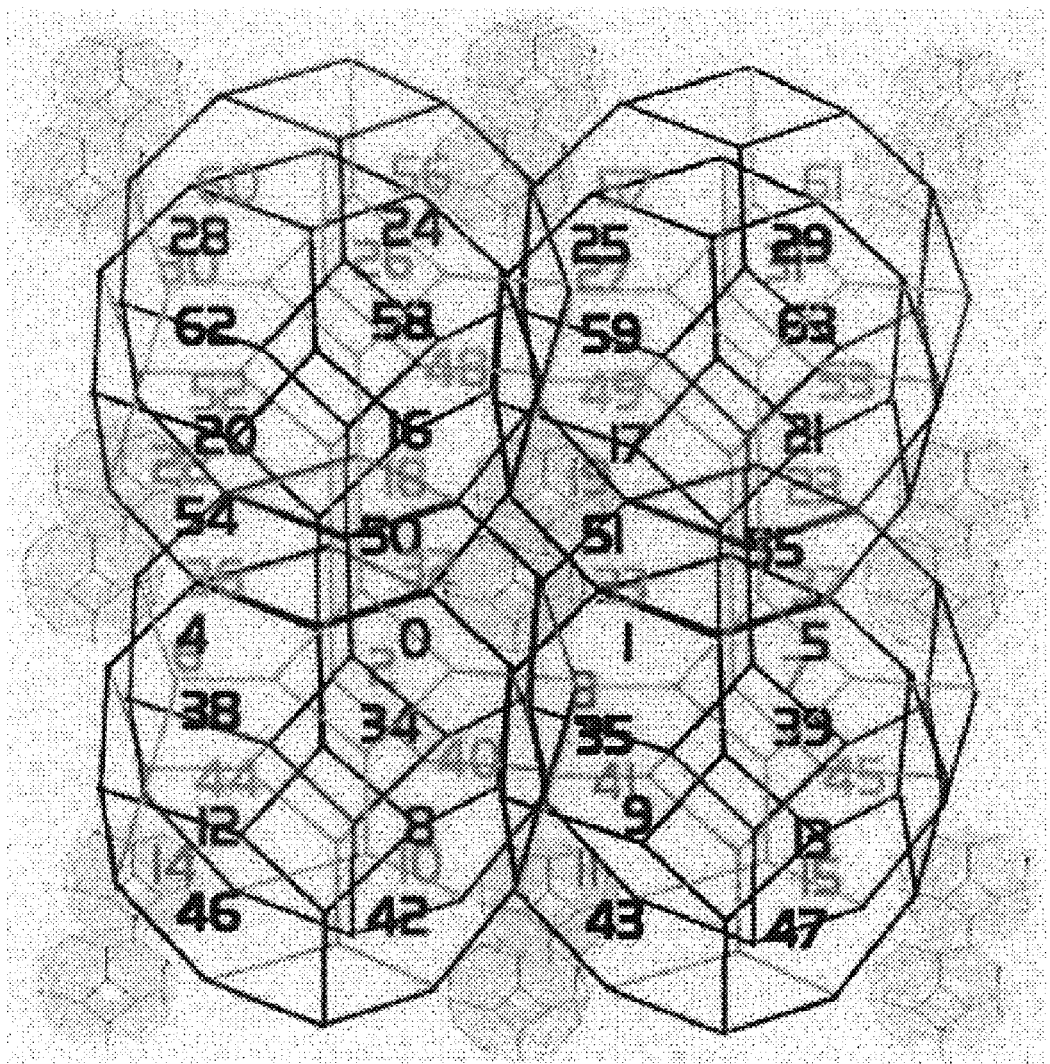

FIG. 16: [Three dimensional] 3D representation of Outer Octagons within a Memory Unit with the same type of activation system as Inner Octagons.

Figure 17:
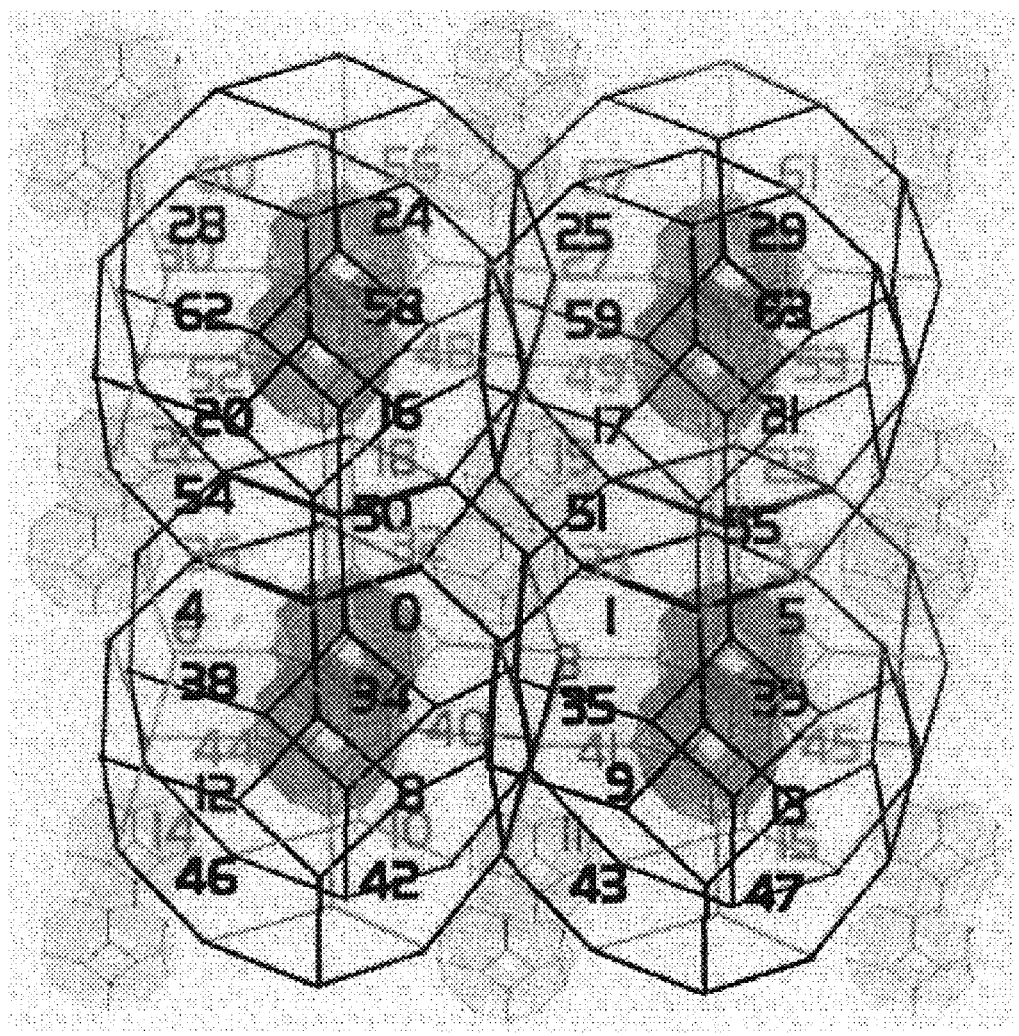

FIG. 17: [Three dimensional] 3D representation of both Inner and Outer Octagons within the Memory Unit. This would obviously extend to [further attached] the Memory Units complex. The 4 Layers and the Memory Unit would represent one module.

DETAILED DESCRIPTION OF THE INVENTION

Figure 1:
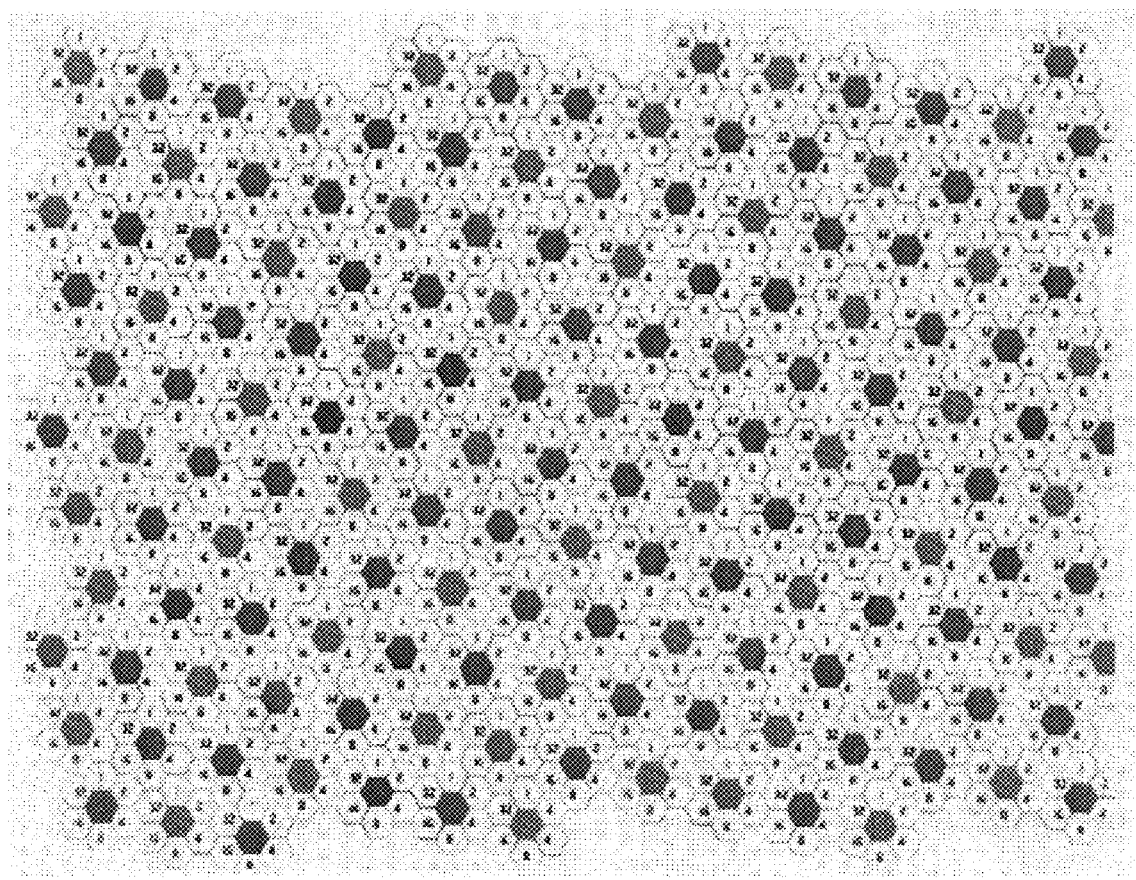
FIG. 1: Sensory Level, showing how the Central Hexagrams and [photoelectric] their receiving cells (which could be photoelectric cells) would be distributed and help explain how it would be used to generate a number output where any given number would always represent the same pattern. Color representation was necessary for visualization, which would otherwise be difficult to achieve. The same holds for all the other color drawings.

This computer architecture starts with the Sensory Level (FIG. 1). [The] Central hexagrams (blue, red or green) [would be] surrounded by photoelectric cells (or other types of receiving cells) that would have an appropriate color filter in front of them (or appropriate input from the other parts of the system). Each Central Hexagram would have a simple CPU, and data and program memory. The CPU would have four alternating modes: Feedback/Input/Analysis/Output. If a photoelectric cell received light, it would create a voltage gradient (the actual electrical circuits will not be described in this application), which would trigger an input to the appropriate binary place in the Central Hexagram. The voltage levels produced by the photoelectric cells would come in discrete steps, with a [total of 7 levels of sensitivity] certain number of level sensitivities. Each Central Hexagram would have the same sensitivity threshold for all of its photoelectric cells at any given time, and a binary place would be activated if the voltage produced equaled or exceeded the threshold level. The Central Hexagram would exhibit a number from 0 to 63, depending on which binary places were activated. [Each] Any given number output from any Central hexagram would represent a given shape, and the totality of the outputs from the Sensory Level would clearly convey the scene in front of it. The smaller the Sensory Level hexagrams, the greater would be the resolution of the image.

Figure 2:
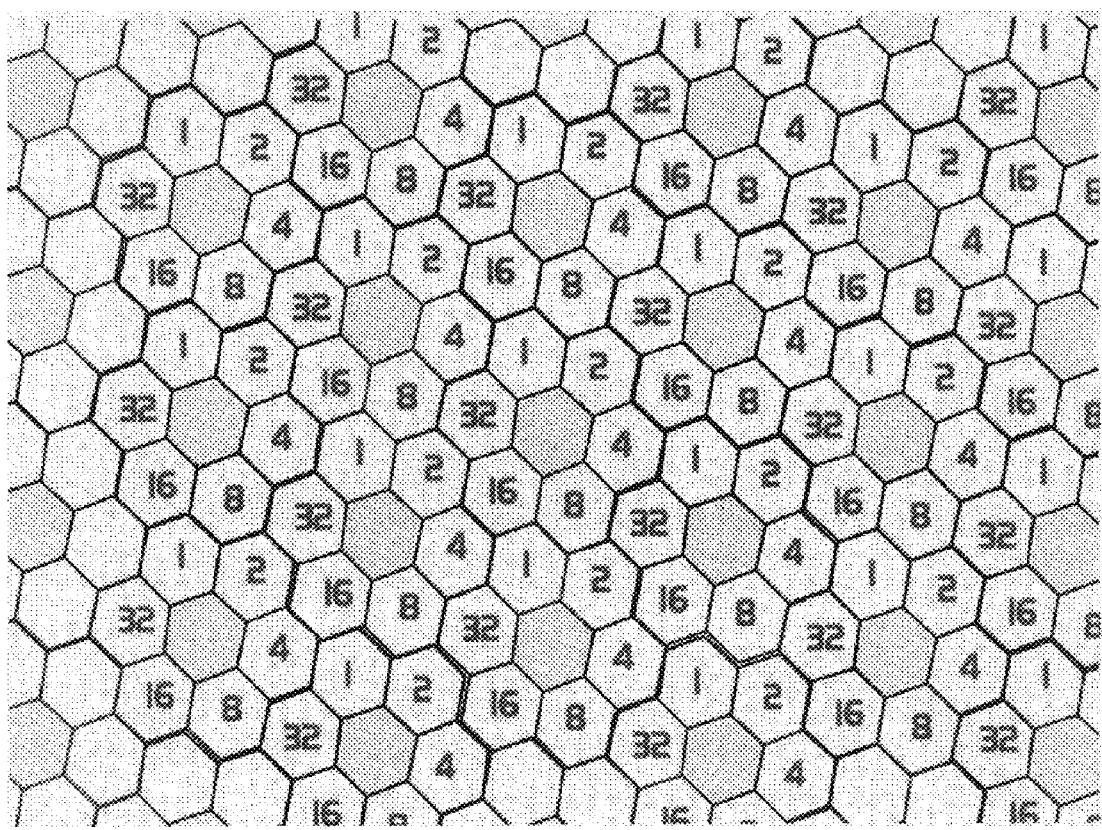
FIG. 2: Showing Level 2a with it's receiving hexagrams used to adjust local brightness and adjust the local threshold level in Sensory Level Central Hexagrams.
Figure 3:
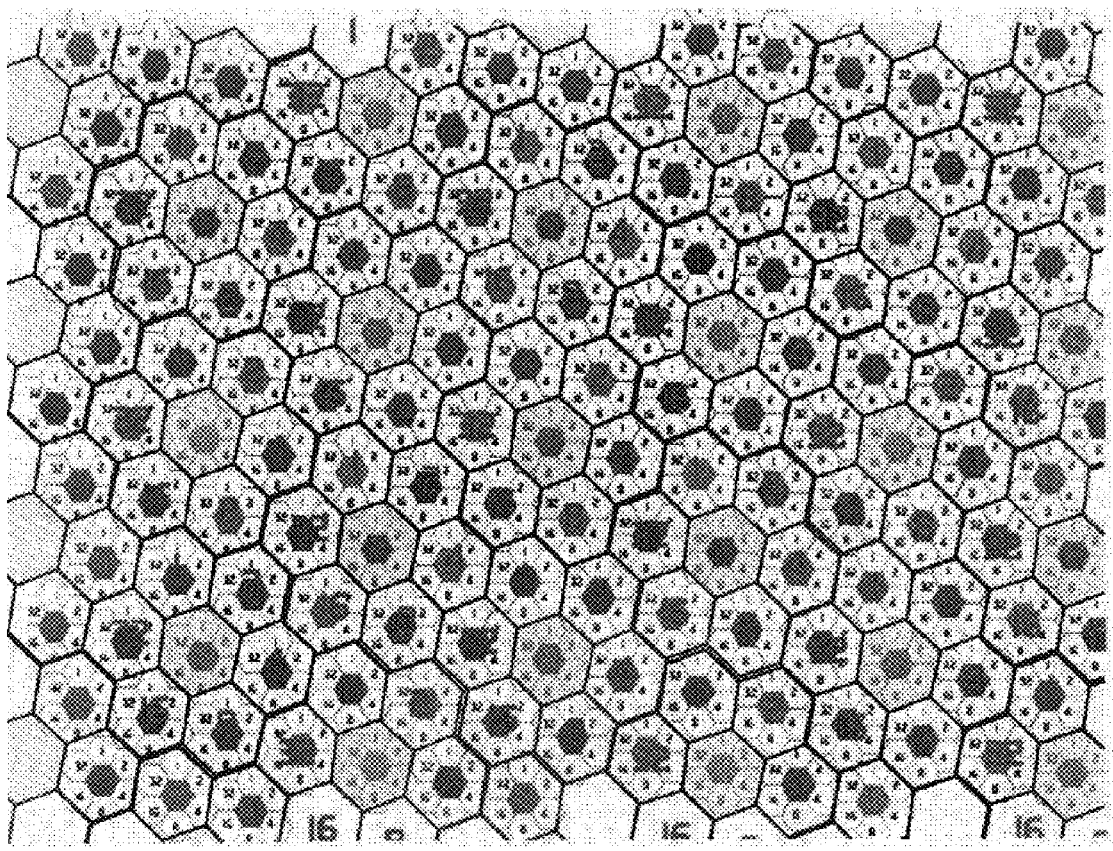
FIG. 3: Showing the overlap of Sensory Level, by Level 2a, in order to indicate the ease of connections between the two as well as different size of hexagrams and their skewed orientation with respect to the Sensory Level.

These outputs would be connected to Level 2a (FIG. 2, and [overlapped with Sensory Level] FIG. 3), which would in its own Central Hexagram contain seven binary positions, one for each of the six surrounding [Sensory Level central hexagrams] receiving cells, and one for it's own Central Hexagram's receiving place. [representing 64]. Each binary position of level 2a [would represented presence of a number from the Sensory Level and the numbers' position with respect to the Level 2a central hexagram] receives the input number from its corresponding Sensory Level Central Hexagram.

Figure 4:
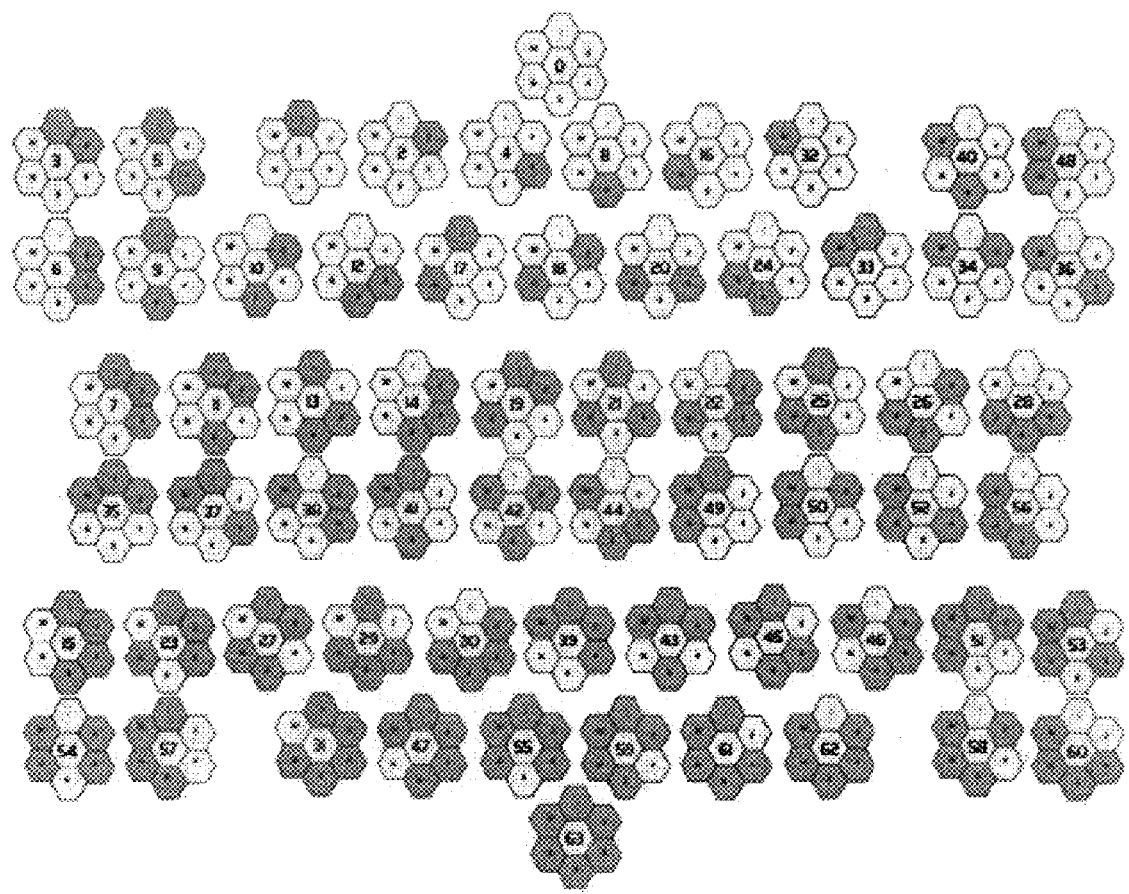
FIG. 4: Showing a spread of all 64 hexagrams, grouped in numbers with one, two, three, four, five and six binary places activated, in order to explain the reasoning behind the type of processing mentioned in the detailed description of the Memory Unit.
Figure 5:
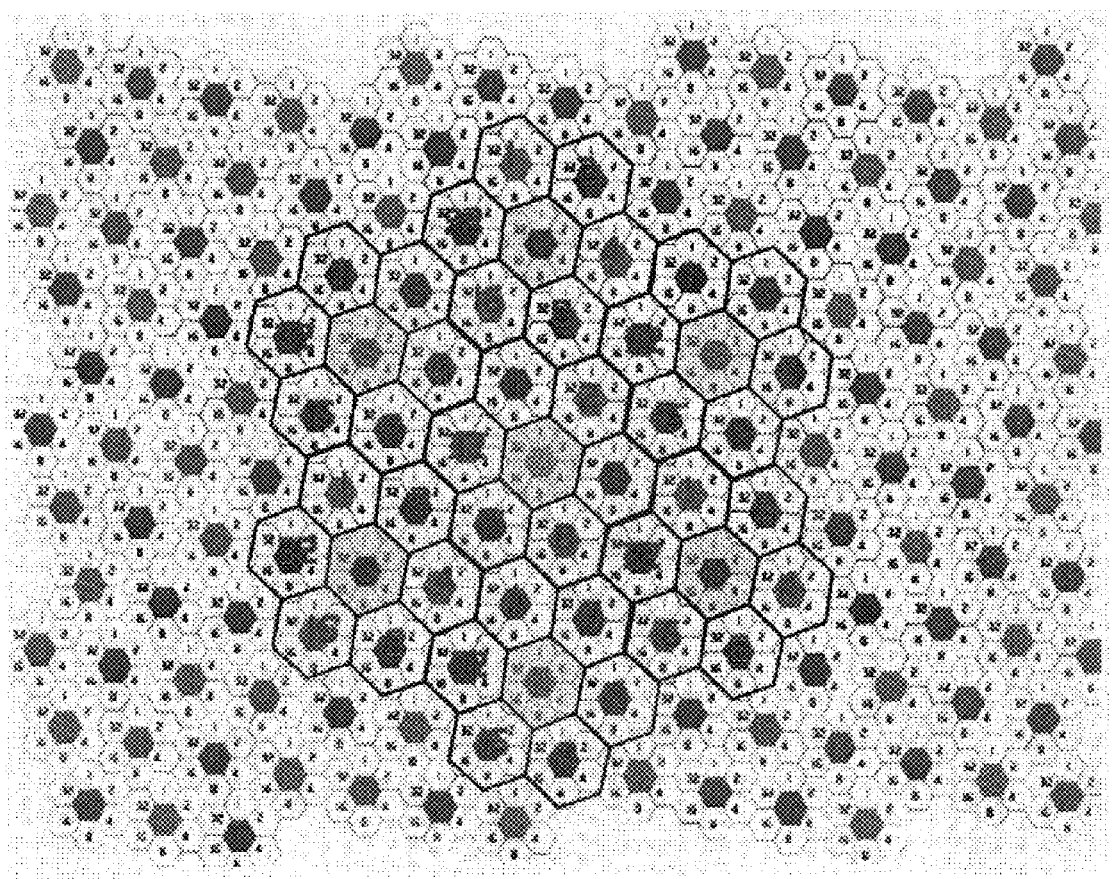
FIG. 5: Showing an overlap of Level 2a over the Sensory Level which [would create] creates sensory level Patch that would be fed to the Memory Unit in the Memory Unit complex, where each two diagonaly adjacent Patches would represent one of the 3D dimensions and feed to the corresponding Memory Units in the Memory Unit complex.

The numbers sent by [central hexagrams of the Sensory Level] Sensory Level Central Hexagrams [would be analyzed] is then analyzed by Level 2a's Central Hexagram's CPU. If a number were 0, CPU would convert it to 0 [in the receiving position binary place]; if the number were 1, 2, 4, 8, 16 or 32, CPU would converter it to 1; if it were 3, 5, 9, 17, 33, 6, 10, 18, 34, 12, 20, 36, 24, 40 or 48, CPU would convert it to 2; if the number were 7, 11, 19, 35, 13, 21, 37, 25, 41, 49, 14, 22, 38, 26, 42, 50, 28, 44, 52 or 56, CPU would convert it to 3; if the number were 15, 23, 39, 27, 43, 51, 29, 45, 53, 57, 30, 46, 54, 58 or 60, CPU would convert it to 4; if the number were 62, 63, 59, 55, 47 or 31, CPU would convert it to 5; and it were 63, CPU would convert it to 6. The logic of that conversion is based on the number of binary places activated in each one of those numbers (FIG. 4), regardless of the pattern position that the activated binary position has. The seven Sensory Level Central hexagram converted numbers would be added and divided by 7. That number would represent average luminosity (brightness) of light at the [patch of 7 central hexagrams] part of the Sensory level. The average luminosity number would also be sent to Levels 2b,g, and r during CPUs Output Mode.

The [result] average luminosity number would be subtracted from each Sensory Level Central Hexagram's converted number. If the result was negative, the Sensory Level Central Hexagram would have its sensitivity threshold [to its photoelectric cells] decreased by the number difference during Level 2a Output Mode. The logic is that the surrounding brightness is greater than the Central Hexagram seems to register, therefore needing to lower its threshold. If the result were positive, the sensitivity threshold [to its photoelectric cells] of Sensory Level Central Hexagram would be increased by the number difference. The logic is that the surrounding brightness is lesser than the Central Hexagram seems to register, therefore needing to increase its threshold. If the result were zero, the sensitivity threshold would not be changed. [The] Minimum sensitivity-threshold-level would be 1, and maximum [7] would depend on the number of sensitivity levels in the receiving cells of the Sensory Level. [That would have] This type of analysis and readjustment would have an effect of lateral inhibition, which emphasizes edges and adjusts to [the] strong [lighting conditions] as well as to weak local lighting conditions.

Figure 6:
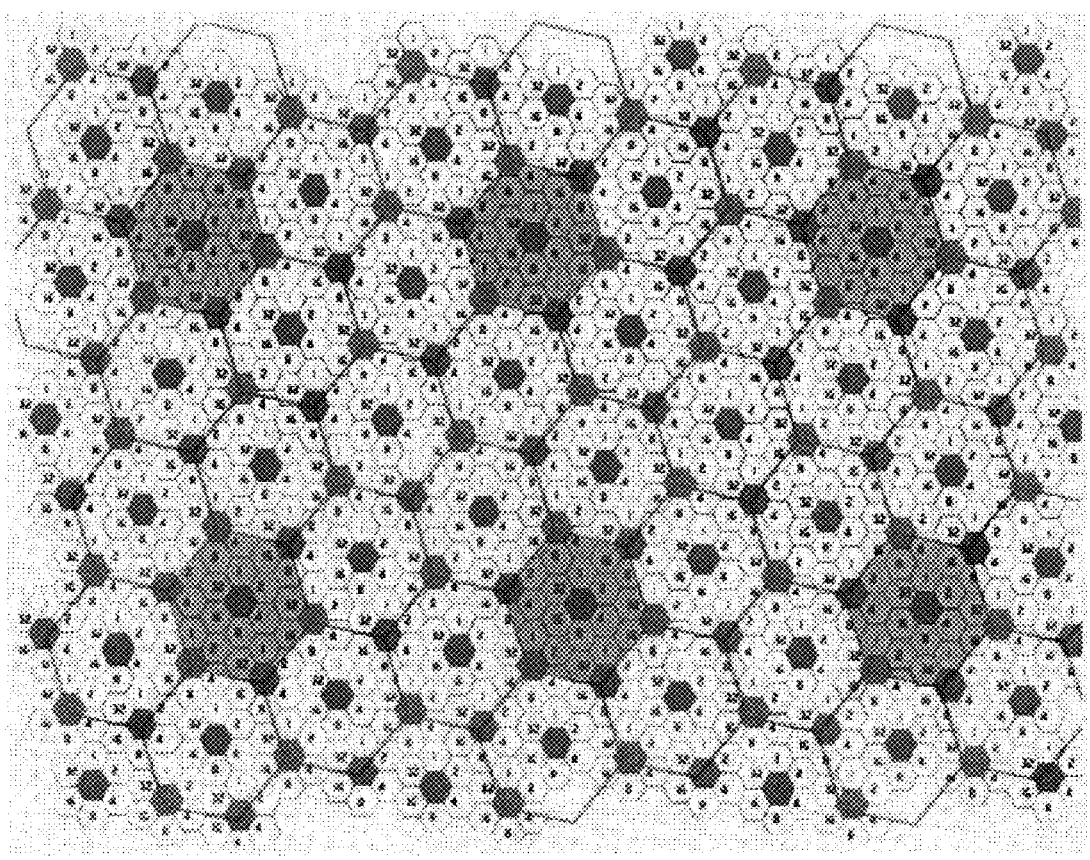
FIG. 6: Showing the physical relation of Level 2b (b for blue) to Sensory Level, clarifying how the Central Hexagrams of that level would receive outputs of only blue color.
Figure 7:
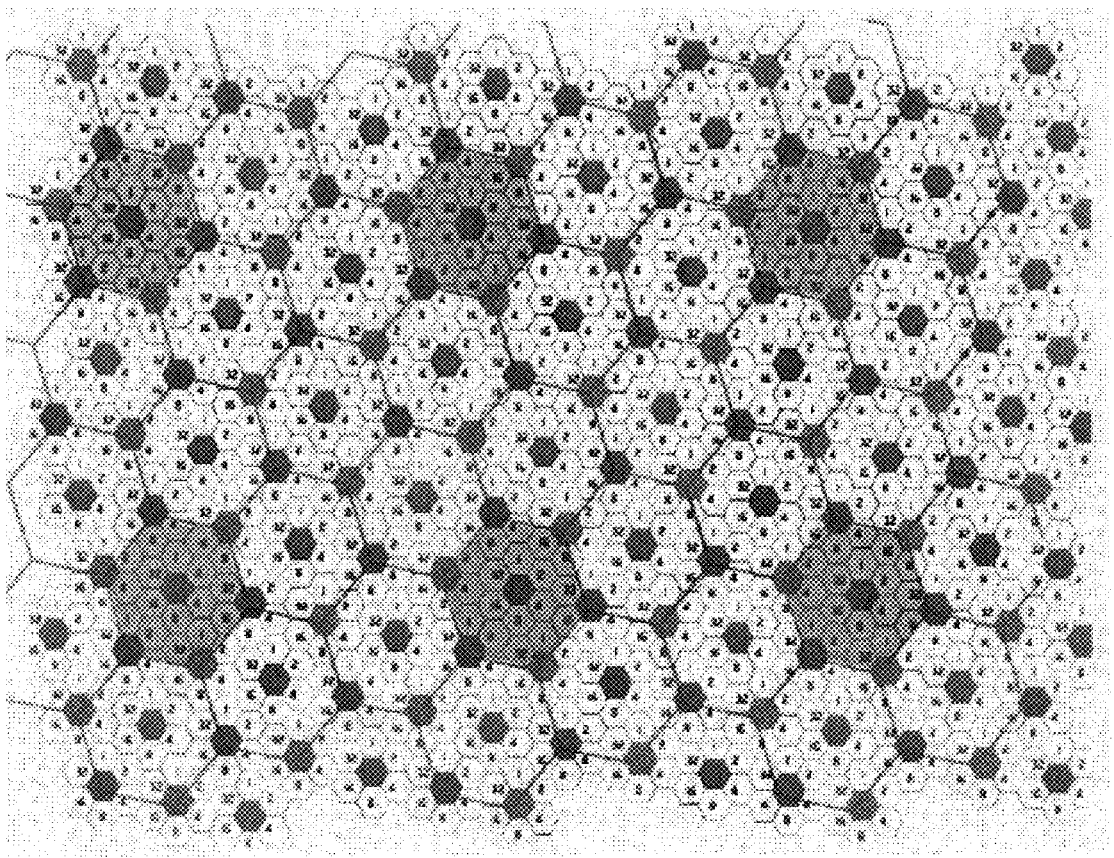
FIG. 7: Showing the physical relation of Level 2g (g for green) to Sensory level, clarifying how the Central Hexagram of that level would receive outputs of only green color.
Figure 8:
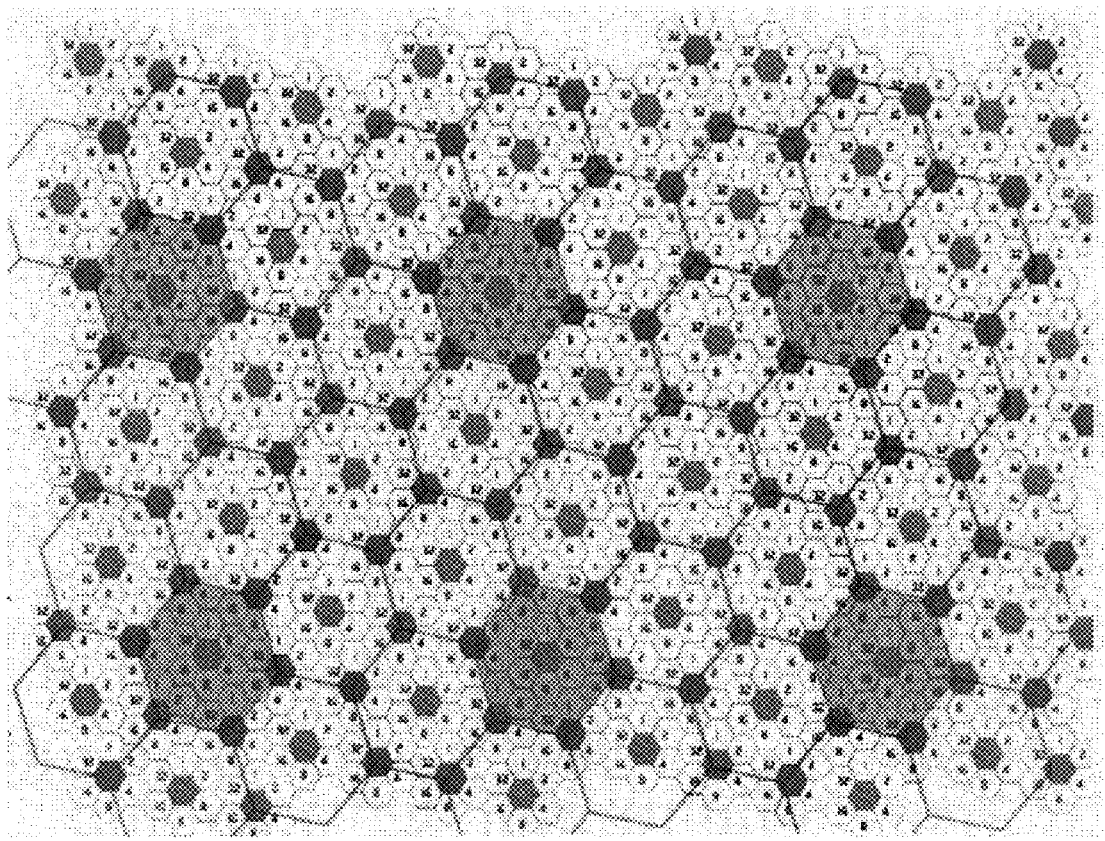
FIG. 8: Showing the physical relation of Level 2r (r for red) to Sensory Level, clarifying how the Central Hexagram of that level would receive outputs of only red color.
Figure 9:
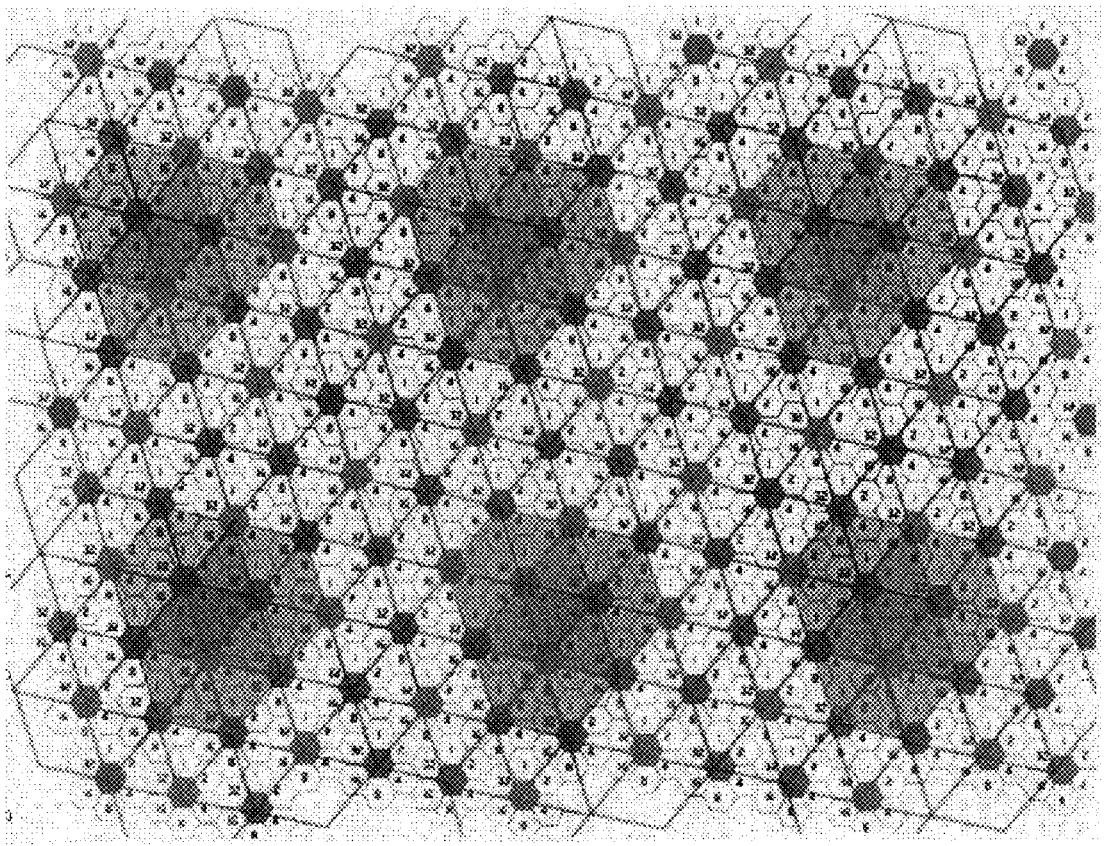
FIG. 9: Overlap of the last three levels over Sensory Level, clarifying their physical relation. These layers would produce a correct local color balance, as explained in the text.
Figure 10:
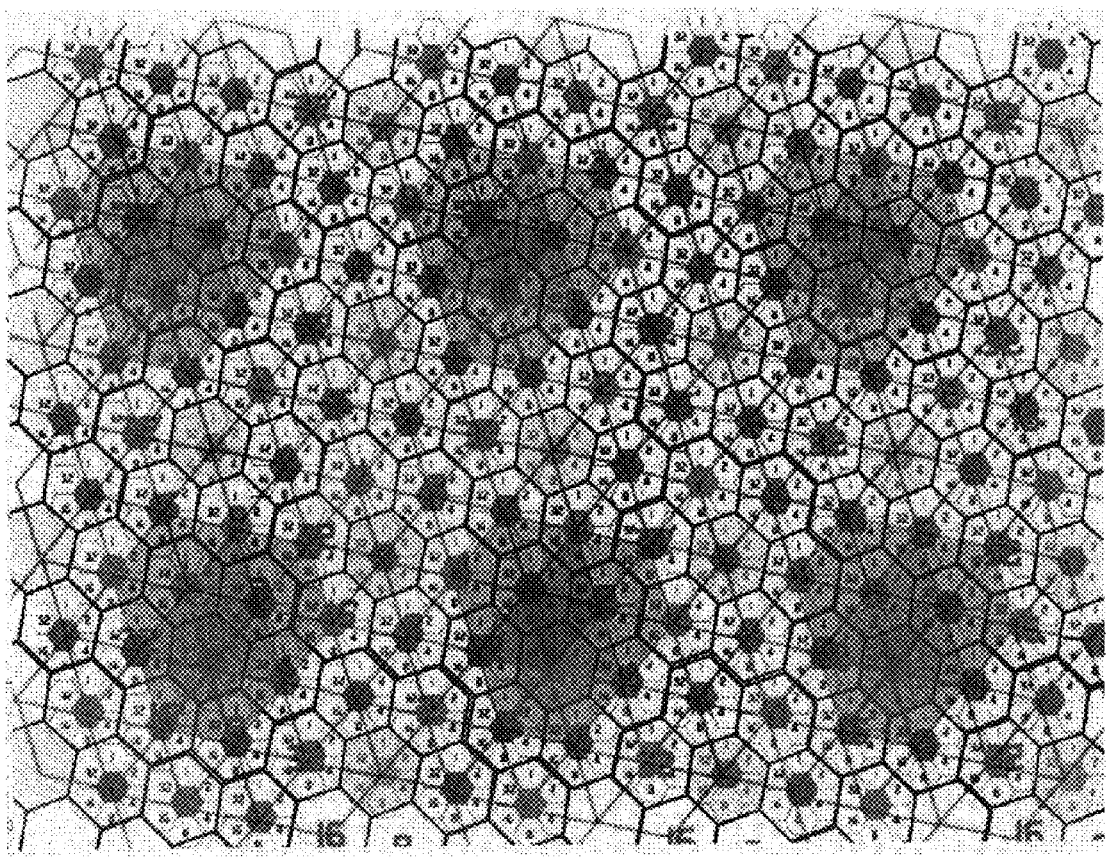
FIG. 10: Overlap of all Level layers over Sensory Level, clarifying their physical relation.

The CPU of the Central Hexagram of Levels 2a would receive input from Sensory Level Central Hexagrams during one clock cycle in its Input Mode. Then it would change from Input Mode to Analysis Mode, turning off reading from the Sensory Level. In the Analysis Mode the CPU [of the central hexagram of Level 2a] would convert inputs, do calculation with them and come out with a result, all that during a specific number of clock cycles. Then the CPU would switch to the Output Mode, adjusting the sensitivity thresholds in the Sensory Level Central Hexagrams [and sending the non-converted numbers (0 to 63) to the Level 3a]. The Sensory Level Central Hexagrams' CPUs would change to Feedback Mode during Level 2a Output Mode, followed by the next Input Mode.] Each number output from the Central Hexagram of the Sensory Level would also be connected to the slightly larger Level 2b, g, r (blue, FIG. 6, FIG. 7, FIG. 8 and overlap of the three layers, FIG. 9), where the Central Hexagram would also contain seven binary positions, and do the same calculation on the input from the Sensory Level as in the Level 2a. All the seven Sensory Level Central Hexagrams at these levels would be of the same color (or type in higher modules). The [number output] averaged average-luminosity-output from the six [from] surrounding 2a Central Hexagrams would be subtracted from the average-color-brightness number of 2b,g, and r. If the answer were 0, it would represent absence of that color [therefore only having brightness (B/W)]; if the answer [was] were positive, it would represent the saturation of that color; and if negative, it would indicate saturation of the other two colors, therefore a positive number would e added to them, which would increase their saturation. [Minimum saturation would be 1 and maximum 7.] Those output numbers would indicate the average saturation of a given color at that point.

The outputs from Input Level (0 to 63) and Levels 2a (brightness) and Levels 2b,g,r (saturation) would go to Level 3[a], identical in size and structure to the Sensory Level. Level 3[a] Central Hexagram's CPU would apply the calculated brightness and saturation to its active binary cells (according to the patterns shown by 0 to 63 numbers), which would then be fed into [digital color monitor] a honeycomb color parallel monitor and Level 4. [The digital monitor output could be stored in a video format for later slower processing by the operator] The honeycomb parallel monitor's output could be stored in an approximate format for slower processing by Operator. The recalled [digital] monitor output would permit [the] Operator to click on [Level 3a output] areas that he estimates contain important shape [to remember], and the "frame" of activated cells would then be [sent to level 4] the input to the Memory Unit complex as 0 to 63 numbers. This would happen during Learning Mode of the system.

Memory storage would have a double system, distributed within Level 4 (of the same structure as the Sensory Level) and [Level 5] Memory Unit complex, one for short-term memory and the other for long-term memory.

The short term memory Level 4 would be able to accommodate a limited number of outputs from Level 3 [a input], depending on the number of sequential Level 4 [sets] layers (suppose [15]10), where Level 4 would store the first input provided by [the operator] Level 3 and would place it to 4 ([15]1), for second input it would shift the input from 4([14]1) to 4(2) [, etc.] and place a new input in 4(1). [When the level 4(1) fills in, the set of 4(15) would be replaced by 4(14), etc., and 4(1) would receive the next input.] One pattern at a time would be fed to Memory Unit complex of the same module, activating stored memories, which would then prime the pattern numbers in the original Memory Unit complex. Within the time limit of a pattern moving from 4(1) to 4([15]10) the [operator] memory retrieval system would given feedback on what part of the pattern [needs to be] had been remembered (with coincidence of remembered and input patterns) in the same or different module (if in Direct Input Mode) or by Operator clicking on the monitor output at the parts of the image that are significant (in the Learning Mode) and that part of the pattern would be fed into [Level 5] Memory Unit complex. [many memory levels possible associated with each memory unit, where there would also be subdivisions of Level 5 memory in terms of what is was supported to represent] If in the Learning Mode, Operator would choose the type of pattern [by selecting from a list, and associating the name and an ID number with the pattern.] (people, animals, things, position, etc., each type directed to a different module, like specific areas in the brain) and associate it with the number and an ID number.

Such a pattern would be independent of location on the Sensory Level by being stored in hexagram cells representing different numbers, from 0 to 63, along with a binary position (location) it had with respect to the Central Hexagram of the Patch. Such pattern representations could be compared and shifted to any Patch of Level 4 frames, and [percent] partial or complete fit would be [calculated] displayed on the honeycombed parallel monitor.

Figure 13:
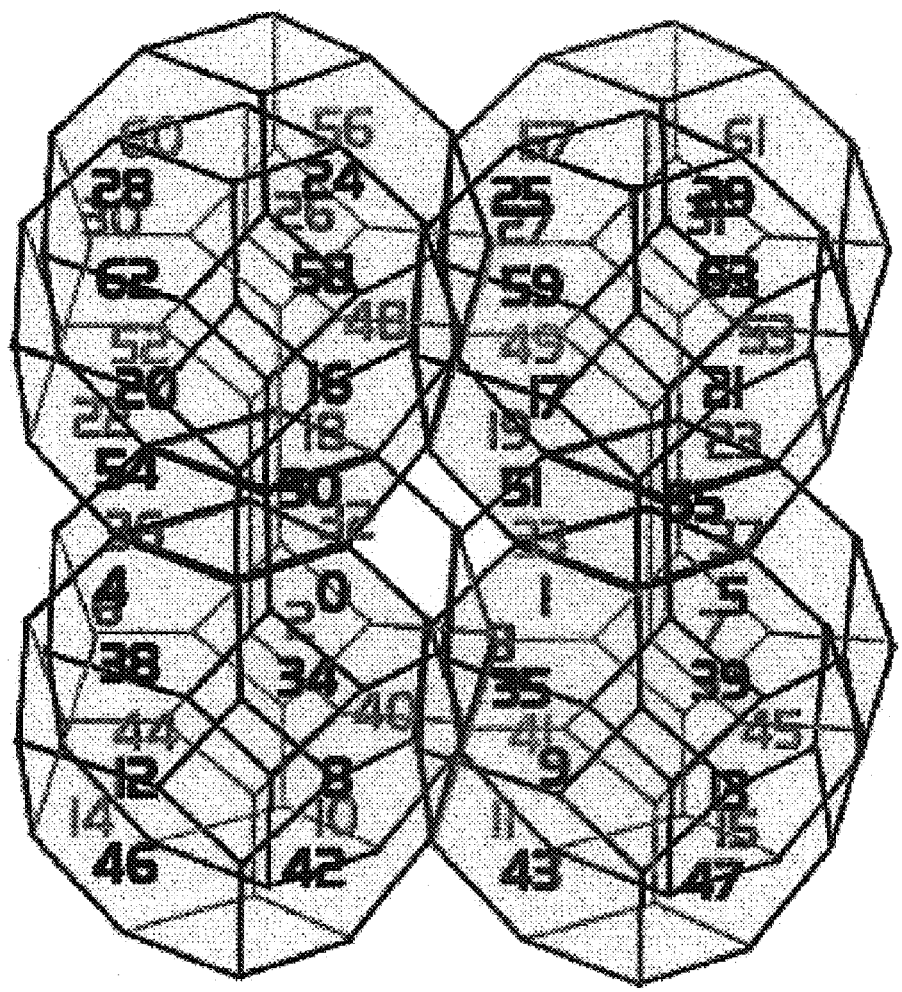
FIG. 13: Three dimensional representation of a complete Memory Unit, unity FIG. 11 and FIG. 12 and receiving complete input from the same Sensory Level Patch. [That] This Memory Unit also shows physical relationships of all 64 binary numbers (where each adjacent binary number is different in only one binary place, therefore only in one "aspect") and clarifies how the clock cycle wave could sweep through the structure to either reach the [sink] "sink" or create

[Level 5 hexagrams would be in] Memory Unit hexagrams are in a lattice-like structure of truncated octahedrons (FIG. 13), where a Patch of 7 Level 4 Central Hexagrams would feed into one [unit of Level 5 memory] Memory Unit [so that the appropriate relational positions of the numbers could be kept] along with the appropriate relational positions with respect to the center of the Patch. The lattice structure would have constant clock cycle activations through number 0 in the [unit of Level 5 memory] Memory Unit in a Direct Input Mode, and the binary places would send on impulses from each 0 location of a given number to the next hexagrams 1 location in the same binary place, thus activating that number, which would then send impulses from its 0 binary places to other hexagrams. In such a manner, there would be constant waves of impulses going through the memory hexagrams "dying" out at number 63 that would act as a "sink". If such activation encountered input from Level 4, that is an already active number, be it out of Level 4 input or through simultaneous wave front activation of more than one binary 1 place, it would stop the progression from that number's 0 binary places and set the memory along with the name of the pattern and its ID, leaving the number active. [If a given number had an input into central place of the memory unit number (recognized as 64), that number] The results of such an interaction would form two types of ["holograms"] hologram-like memories, one four "figure" (fed in from Level 4), and one for "ground" (created through interaction with clock impulses). [Each number hexagram would continue its 0 to 1 progression only if all of its 1 places had been activated by the clock impulses. The ground patterns would also be memorized and associated with the same name and ID.]

Such patterns could be used as a basis for pattern recognition by being triggered directly from the Level 4 when in recognition mode, that is when the Memory Units have been primed, prior to Level 4 input, by the memory stored in Outer or Inner Octagons activated by more than the threshold number of side hexagons, either directly when in Direct Input Mode, or from other modules when in a Feedback Mode.

The Patch patterns [could] would be fed into Memory Units sequentially from Level 4. The Memory Unit's central CPU would pick up the [patches of certain percent of matching (with figure or ground, and then adjust the rest of the memorized pattern under the same ID to it.] Patch inputs and send activated numbers toward Inner and Outer octagons, whose thresholds of how many active side hexagons would activate them, could be set from other modules. If either of the two [exhibited a certain percent of stored image (percentage modifiable by the operator), the pattern name would be displayed on the monitor,] sets was activated the Figure and Ground would both be displayed on the honeycomb parallel monitor (all the numbers that had the same ID, regardless if they were active or not in the new input from Level 4), showing the match of Figure or Ground by the increase of brightness, reversal of color or alike, as well as displaying the names and IDs of all possible pattern matches. The Operator could then check the likeness of each pattern by clicking through the names. Such recognition mode could also be atomatized and used as an active search tool. If the pattern did not reach a given [percentage] threshold, the pattern would [be discarded] not be activated.

Figure 11:
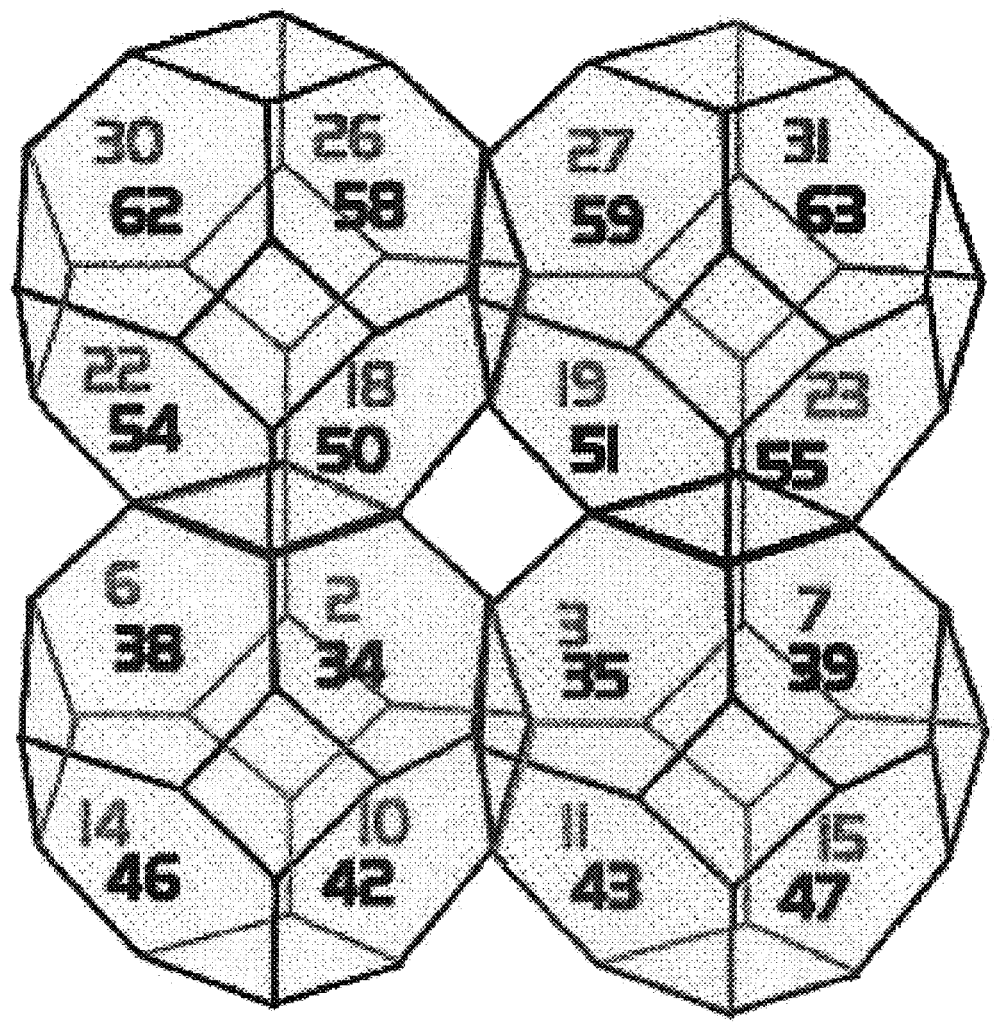
FIG. 11: [Three dimensional] 3D representation of front four octagons of one Memory Unit that would receive input from [one] a Sensory Level Patch.
Figure 12:
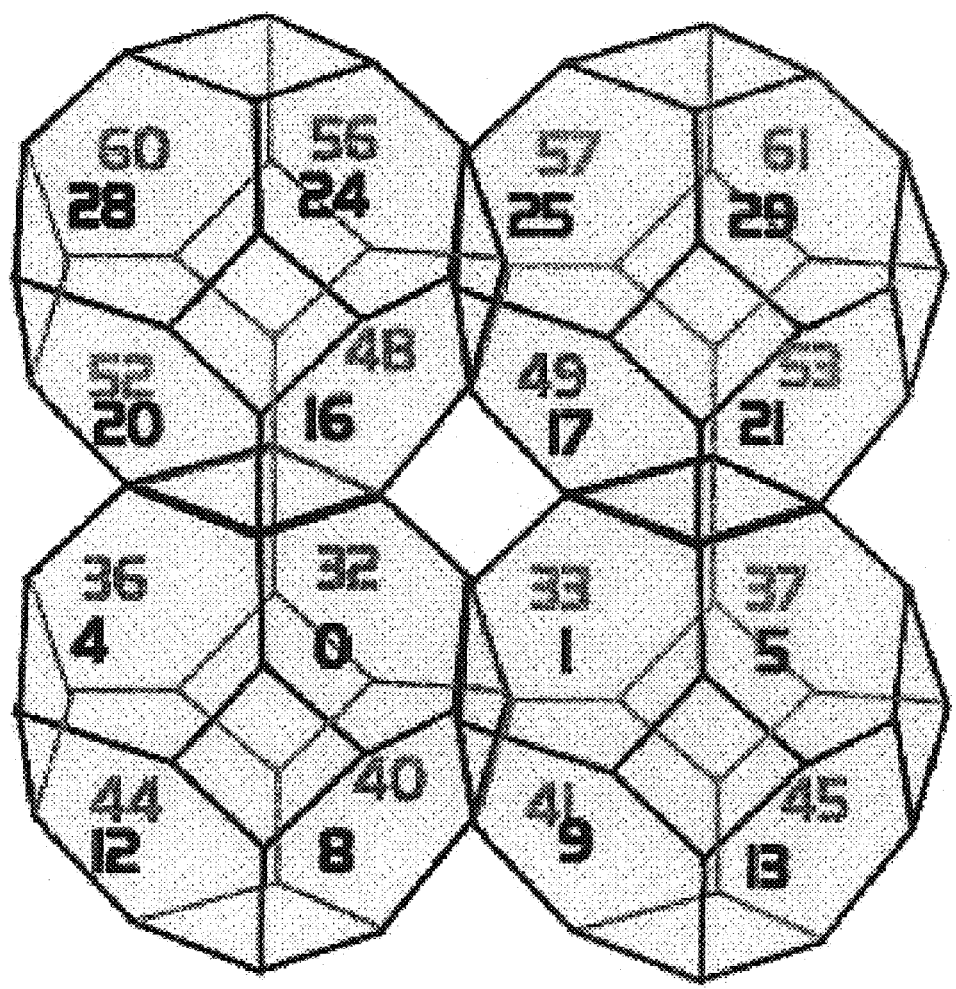
FIG. 12: 3D representation of four back octagons of one Memory Unit that would receive input from [one] the same Sensory Level Patch.

The Memory [in Level 5(one memory unit in] Unit (FIGS. 11, 12, 13, [connected memory units in] FIG. 14) would work in the following manner.

1) When a pattern number from Level 4 hexagram Patch is received by [a number hexagram of Level 5]a side number hexagram of the Memory Unit, along with the position of the pattern with respect to the center of the patch, the threshold to that position in the central number hexagram of the Patch would increase by 1 (which would later be interpreted as more important, and could be displayed as brighter, or the like, on the honeycomb parallel monitor). The Operator could inhibit this number later when the feedback is negative, and would decrease the [number by 1 each time] threshold. The lowest number would be 0. These thresholds would be memorized in the side number hexagrams.

2) To tie together all the inputs from the Patch at [a] any given time, the activated side number hexagrams would [activate the cell in the middle of the octagon (inner octagon cell)] send to the adjacent Inner Octagon (FIG. 15) [by sending] the ID number [to it]. The activated Inner Octagon cell would set the memory to such a side number hexagram with the ID, [Then it would] and would send an impulse to the six [surrounding] adjacent Inner Octagons [cells] sending the same ID. If any one of those [cells] adjacent Inner Octagons [was] were also activated, [it] they would send back the same ID. Such an interaction (handshake connection) would then be memorized in both Inner Octagons [cells] with the same ID. Any time that any one of those Inner Octagons gets activated with the same set of side number hexagrams, all the IDs that were memorized using the same pattern of side number hexagrams would become active. Whenever an ID is sent by an Inner Octagon to the adjacent Inner Octagons that had memorized that ID, that adjacent Inner Octagon would also activate all the others that originally had memorized that same ID. [Such doing] That would tie all the active Inner Octagon cells over the whole [field of Sensory Layer] Memory Unit complex, [all together] representing the perceived pattern, which could then be activated and identified by only a small part of the perceived pattern. That would occur in the Learning Mode.

3) Background active [cells] side number hexagons left from the 0 number wave wold instead activate the Outer Octagon cells (FIG. 16), which would go through the same process, [originating its own clock ID] using the same ID as Inner Octagons, in order to tie the "background" together over the whole field. Such a background would not represent the Sensory Layer background, but the shape interference background. [Active Inner octagon cells would send its ID to surrounding outer octagon cells, which, if active, would send back its own clock ID, and both would memorize the others and ones own ID. All] That would occur in the Learning Mode.

4) In recognition mode Level [3] 4 would send all the Central Hexagram numbers (except 0 which represents no input [and 63]) to [Level 5] Memory Units, which would activate side number hexagrams, which in turn would send impulses to Inner Octagon cells [without any ID]. The memorized ID connections between the side number hexagrams [which in turn would send impulses to] and the Inner Octagon [cells] would be sent to other Inner Octagons if the threshold number for that combination of side number hexagons were activated. If the same ID were received back, the connections would "lock" [and the same ID would be tried on other inner octagons memorized with the same ID]. If [all those memorized IDs were not "locked"] none of the memorized IDs were "locked" no activation of Inner Octagons would occur, therefore no recognition, [then it would try next memorized ID] The same system would be used for the Outer Octagons. If the Inner Octagon does "lock", it would activate the side number hexagons, and from there [Level 3 and the output to digital monitor] the honeycomb parallel monitor, exhibiting parts that were recognized with name and ID.

5) Several IDs could be activated at the same time; therefore the whole list of names associated with recognition would be displayed on the side [with the % similarity]. The Operator could "lock on" a given pattern, and with it modify the memory [where only the active memory site would be left] by decreasing the strength of other IDs and increasing the strength of the "recognized" ID, thus creating the essence of that pattern [stored with a new ID and name].

6) Activated ID would also stimulate the Background in the memory through Outer Octagons associated with that ID. [Background] Outer Octagons would react in the same manner as Inner Octagons, and could then activate different clock IDs associated with the [activating] Inner Octagons that way making connections between patterns that did not exist before, a sort of "intuition" or "imagination".

7) Comparisons, unexpected connections, etc. could occur in such a system, leading to other areas of "thought" that would be combining patterns through translation, deformation, rotation, sizing and other ways.

In all levels, CPUs would have two areas, one for a memory of a program and another for data [execution memory]. The levels above would be able to modify the programs on lower levels, therefore their functioning sometimes just by varying the number of a constant. All the information from each level (programs and data) would be accessible for display on a monitor and under Operator's control.

The complexity of analysis and architecture of such a computer [could] can increase with use and further developments. My belief is that such a new architecture could be used for creation and exploration of Artificial Intelligence, Visual analysis as well as later auditory or other "sense" synthesis (in memory like patterns), without being limited to a too close imitation of human nervous system, yet using the insights gathered from such a research.

The actual elaboration and building of such a computer would use many of the state of the art systems and processes. The programming of this computer would involve its architecture as well as modification and elaboration of short Central Hexagram programs.

I claim:

1. A parallel computer architecture comprising hexagram cells each such cell capable of computation and organized in groups wherein the groups of cells are in three-dimensional interconnected layers, said layers comprising:

(a) a sensory level with a central hexagram and six surrounding hexagrams distributed in a three-dimensional hexagram cell groups of 64 cells, wherein the central hexagram is a central processing unit and its 6 surrounding hexagrams are photoelectric cells, wherein a red, green and blue color filter covers at least the photoelectric cells surrounding 3 different central hexagrams, wherein each photoelectric cells has 7 levels of light sensitivity each creating a unique voltage gradient that triggers an input to a binary place in the central hexagram, and wherein each central hexagram is configurable with the same sensitivity threshold to all of it's surrounding photoelectric cells at any one given time;

(b) a second level having three sublevels wherein the second level has a hexagonal grid structure with a central hexagram and 6 six surrounding hexagrams distributed in a three-dimensional hexagram cell groups of 64 cells, wherein a central hexagram is a central processing unit surrounded by 6 receiving hexagram memory units, wherein the hexagonal grid structure of the second level overlaps with the sensory level hexagonal grid structure so that each central processing unit connects with a patch of 7 central hexagrams of the sensory level, such that each sublevel corresponds to central hexagrams in the sensory level surrounded by photoelectric cells covered by a one of the red, green and blue filters, wherein the second level central hexagram contains seven binary positions, one for each of the six surrounding sensory level central hexagrams, and one for the second level's own central hexagram's receiving place; and wherein the central processing unit can analyze and convert the numbers exhibited from each central hexagram in the sensory level and change the sensitivity threshold of the central hexagram of the sensory level to the photoelectric cells only if the result of the analysis and conversion meets a pre-defined threshold level;

(c) a third level having a hexagonal grid structure matching the second level, wherein the third level central processing unit is connected to the second level and to a digital color monitor to permit an operator to select third level output for input to memory storage; and, (d) a plurality of levels for memory storage wherein each such level is assigned a sequential level number above the third level and each such level having a central hexagram that is a central processing unit.

2. The parallel computer architecture of claim 1 wherein each central processing unit of the second level is capable of (a) receiving input from a sensory level central hexagram during one clock cycle in an input mode;

(b) then, during a specified number of clock cycles, changing from input mode to analysis mode turning off reading from the sensory level, (c) converting inputs, performing calculations with the inputs, and producing a result; and, (d) then switching to output mode, making any adjustments to the sensitivity thresholds in the sensory level central hexagrams, and sending results to the third level;

and wherein the sensory level is capable of changing to receiving mode during the second level output mode.

3. The parallel computer architecture of claim 1 wherein the plurality of levels of memory storage comprises a fourth level and a fifth level, each level having short-term memory and long-term memory, wherein the fourth level has the same hexagonal grid structure as the sensory level, wherein the fifth level has hexagrams in a structure of truncated octahedrons having a central hexagram that is a central processing unit, wherein the fifth level overlaps with the fourth level hexagonal grid structure so that each central processing unit in the fifth level connects with a patch of 7 central hexagrams of the fourth level.

\* \* \* \* \*